United States Patent
Okoge et al.

(10) Patent No.: US 8,024,589 B2
(45) Date of Patent: Sep. 20, 2011

(54) INFORMATION STORAGE DEVICE, INFORMATION RECORDING/REPRODUCING DEVICE, AND POWER CONSUMPTION MANAGEMENT METHOD

(75) Inventors: Takahiro Okoge, Kawasaki (JP); Keiji Katata, Sayama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 12/741,466

(22) PCT Filed: Nov. 5, 2007

(86) PCT No.: PCT/JP2007/071482
§ 371 (c)(1),
(2), (4) Date: May 5, 2010

(87) PCT Pub. No.: WO2009/060503
PCT Pub. Date: May 14, 2009

(65) Prior Publication Data
US 2010/0257390 A1    Oct. 7, 2010

(51) Int. Cl.
*G06F 1/32* (2006.01)
(52) U.S. Cl. .................................. 713/320; 713/323
(58) Field of Classification Search .................. 713/320, 713/323
See application file for complete search history.

(56) References Cited

U.S. PATENT DOCUMENTS

2005/0235171 A1* 10/2005 Igari ............................. 713/323
2006/0069932 A1* 3/2006 Oshikawa et al. ............ 713/300

FOREIGN PATENT DOCUMENTS

| JP | 2000-089861 | 3/2000 |
| JP | 2001-325048 | 11/2001 |
| JP | 2006-018388 | 1/2006 |

OTHER PUBLICATIONS

International Search Report for PCT/JP2007/071482, mailed Nov. 27, 2007.
Office Action (2 pgs.) dated Dec. 14, 2010 issued in corresponding Japanese Application No. 2009-539889 (now JP Patent No. 4681671) with an at least partial English-language translation thereof (1 pg.).

* cited by examiner

*Primary Examiner* — Thomas Lee
*Assistant Examiner* — Xuxing Chen
(74) *Attorney, Agent, or Firm* — Nixon & Vanderhye P.C.

(57) ABSTRACT

An information recording/reproducing device, wherein a power management mechanism for a serial ATA interface connecting between an optical disk drive and a host computer has a steady-state power mode (PHYRDY) and a power-saving mode (Partial state, Slumber state) to keep power consumption lower than the steady-state power mode, while a power management mechanism built into the optical disk drive has a steady-state power mode (active state) and a power-saving mode (inactive mode) to keep power consumption lower than the steady-state power mode. The optical disk drive controls transition of the power consumption modes of the power management mechanism for a serial ATA interface in accordance with current power consumption mode of its internal power management mechanism.

7 Claims, 7 Drawing Sheets

| | | DRIVE IS IN ACTIVE STATE | DRIVE IS IN NON-ACTIVE STATE |
|---|---|---|---|
| INTERFACE IS IN PHYRDY STATE | TRANSITION CONDITION | STATE WHERE NO COMMAND IS RECEIVED CONTINUES FOR 100 msec AFTER RECEPTION OF PREVIOUS COMMAND | STATE WHERE NO COMMAND IS RECEIVED CONTINUES FOR 1 msec AFTER RECEPTION OF PREVIOUS COMMAND |
| | TRANSITION TIMING | 100 msec AFTER RECEPTION OF PREVIOUS COMMAND | 1 msec AFTER RECEPTION OF PREVIOUS COMMAND |
| | TRANSITION DESTINATION | PARTIAL STATE | PARTIAL STATE |
| INTERFACE IS IN PARTIAL STATE | TRANSITION CONDITION | STATE WHERE NO COMMAND IS RECEIVED CONTINUES FOR 100 msec AFTER COMPLETION OF TRANSITION TO PARTIAL STATE | STATE WHERE NO COMMAND IS RECEIVED CONTINUES FOR 1 msec AFTER COMPLETION OF TRANSITION TO PARTIAL STATE |
| | TRANSITION TIMING | 100 msec AFTER COMPLETION OF TRANSITION TO PARTIAL STATE | 1 msec AFTER COMPLETION OF TRANSITION TO PARTIAL STATE |
| | TRANSITION DESTINATION | SLUMBER STATE | SLUMBER STATE |

(b)

| | | DRIVE IS IN ACTIVE STATE | DRIVE IS IN NON-ACTIVE STATE |
|---|---|---|---|
| INTERFACE IS IN PHYRDY STATE | TRANSITION CONDITION | STATE WHERE NO COMMAND IS RECEIVED CONTINUES FOR 5 msec AFTER RECEPTION OF PREVIOUS COMMAND | STATE WHERE NO COMMAND IS RECEIVED CONTINUES FOR 5 msec AFTER RECEPTION OF PREVIOUS COMMAND |
| | TRANSITION TIMING | 5 msec AFTER RECEPTION OF PREVIOUS COMMAND | 5 msec AFTER RECEPTION OF PREVIOUS COMMAND |
| | TRANSITION DESTINATION | PARTIAL STATE | SLUMBER STATE |

INFORMATION STORAGE DEVICE, INFORMATION RECORDING/REPRODUCING DEVICE, AND POWER CONSUMPTION MANAGEMENT METHOD

This application is the U.S. national phase of International Application No. PCT/JP2007/071482 filed 5 Nov. 2007, which designated the U.S. and the entire contents of which is hereby incorporated by reference.

TECHNICAL FIELD OF THE INVENTION

The present invention relates to a technique for controlling a power consumption mode of an interface in an information storage device such as an optical disc drive unit and, more particularly, to a technique suitably applied to an information storage device provided with a serial ATA interface.

BACKGROUND ART

In recent years, a serial ATA interface is adopted as an interface for connecting a host computer (e.g., personal computer) and an information storage device such as a hard disc drive or an optical drive (e.g., DVD (Digital Versatile Disc) drive). The serial ATA can realize a higher data transfer speed than a parallel ATA. However, a high-speed clock (e.g., 750 MHz) is used in the serial ATA, which makes the power consumption in the serial ATA higher than that in the parallel ATA.

Thus, in the serial ATA specification, three power consumption modes of PHYRDY, Partial and Slumber are defined so as to realize a power saving function. Partial and Slumber are each a "power saving mode" in which the power of an interface circuit is turned off to disable communication, and PHYRDY is a steady-state in which communication is enabled. When communication needs to be started in the power saving mode, it is necessary to set back the power consumption mode from the power saving mode to PHYRDY state, so that the recovery time to PHYRDY state occurs to cause an operational delay. Further, the serial ATA specification has a feature that, in PHYRDY state, a host computer and an information storage device connected via the serial ATA transmit high frequency signals to each other even while they do not perform data exchange. That is, in PHYRDY state, a high power is always consumed irrespective of presence/absence of data to be exchanged.

Figure 1:
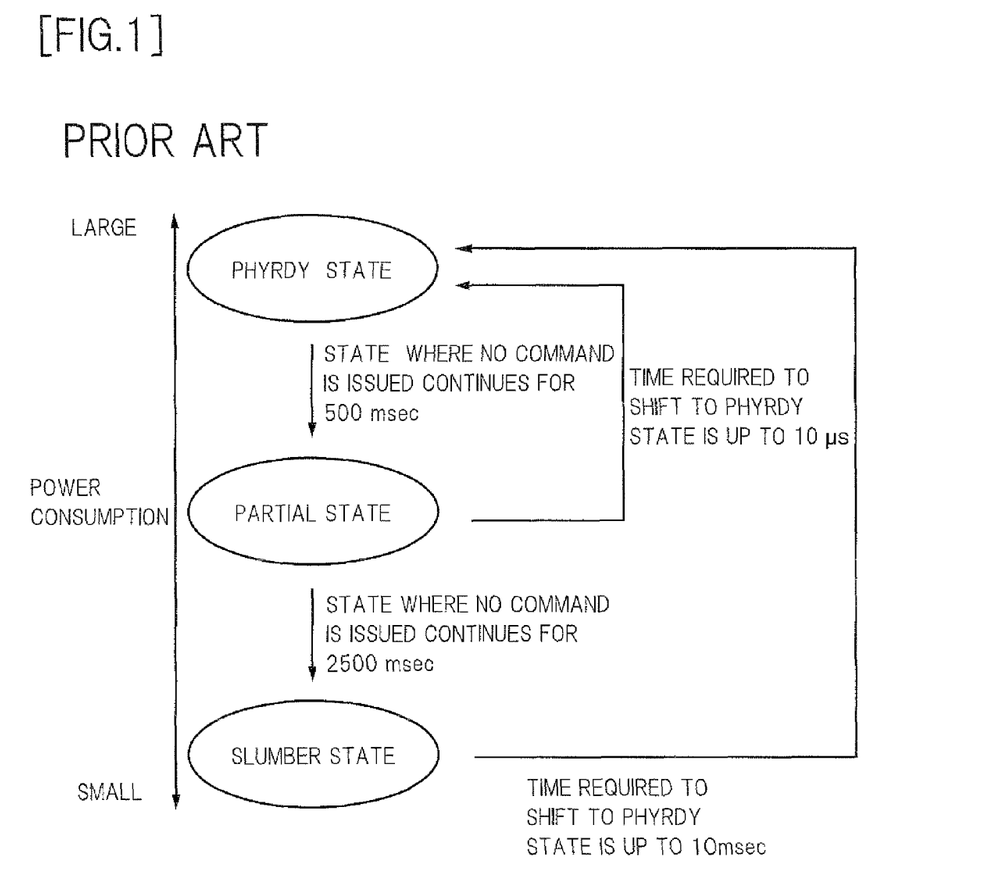
FIG. 1 is a view showing the outline of a conventional power consumption mode of a serial ATA interface.

FIG. 1 shows the outline of the power consumption mode of the serial ATA interface. As shown in FIG. 1, the power consumption becomes lower in order of PHYRDY state, Partial state, and Slumber state. The Partial state and Slumber state correspond to the abovementioned "power saving mode", and the time required for transition from the power saving mode to PHYRDY state is larger from the Slumber state than from the Partial state. More specifically, the time required for transition from the Partial state to PHYRDY state is up to 10 μsec, and time required for transition from the Slumber state to PHYRDY state is up to 10 msec. As described above, the power saving mode can include "low power saving mode" and "high power saving mode" depending on the number of turn-off interface circuits. The "high power saving mode" has higher power saving effect than the "low power saving mode", while it requires more time for transition to a steady-state in which communication is enabled than the "low power saving mode".

Here, a transition method to the power saving mode in the serial ATA interface in the case where a host computer and an optical drive are connected to each other by the serial ATA interface will be described. The following process is carried out in a conventional transition method. That is, when a state where no command is issued from the host computer to optical drive continues for a certain time period (e.g., 500 msec) in the PHYRDY state, the optical drive transmits a request (message for requesting transition to the Partial state) to the host computer, and the power consumption mode shifts to the Partial state. After that, when a state where no command is issued from the host computer to optical drive continues for a certain time period (e.g., 2,500 msec) in this Partial state, the optical drive transmits a request (message for requesting transition to the Slumber state) to the host computer, and the power consumption mode shifts to the Slumber state.

As a conventional art document relating to such a conventional technique, the following patent document discloses a technique for realizing the power saving inside a disc storage device.

Patent Document 1: Jpn. Pat. Appln. Laid-Open Publication No. 2001-325048

DISCLOSURE OF THE INVENTION

Problems to be Solved by the Invention

A certain time period (10 μsec to 10 msec) is required for transition from the power saving mode to PHYRDY state as described above, so that if the power consumption mode shifts to the power saving mode in a state where frequent communications are being conducted, communication performance decreases. Therefore, conventionally, a comparatively long time period of 500 msec or 3,000 msec was set as the certain time period for the transition between the PHYRDY state to power saving state (Partial or Slumber state). Thus, in a conventional technique, a certain fixed time period is required for transition to the power saving mode, which makes it difficult to realize quick transition to the power saving mode even when the optical drive is in a non-active state (where optical disc is rotating at a low speed or stopped).

The host computer (e.g., a personal computer running on Windows® OS) issues to the drive a command (specifically, Get Event Status Notification command or Test Unit Ready command) for checking a state (presence/absence of an optical disc) of the drive at one-second intervals. Thus, in the transition method to the power saving mode based on the elapse of a certain time period, the power saving function cannot be effectively achieved in practice (transition from the PHYRDY state to Slumber is impossible, and Partial state, if achieved, can continue for only 500 msec).

A use of an asynchronous event notification mechanism (Asynchronous Notification) enables a reduction in the frequency of the command issuance from one-second intervals. However, in order to realize this approach, it is necessary to modify the specification of the host computer. Thus, it cannot be said at this time that this approach is practicable.

The present invention has been made to solve the above problems, and an object thereof is, in an information recording/reproducing device constituted by an information storage device and a host computer connected by means of a serial interface such as a serial ATA interface, to provide an information storage device capable of achieving optimum power saving by flexibly controlling the power consumption mode of the interface depending on its own state, an information recording/reproducing device, and a power consumption management method.

Means for Solving the Problems

To solve the above object, according to a first aspect of the present invention, there is provided an information storage device in an information recording/reproducing device that has a host computer and an information storage device connected to each other via an interface, the interface being provided with a power management mechanism having a first power consumption mode and a second power consumption mode to keep power consumption lower than the first power consumption mode, and the information storage device being provided with an internal power management mechanism having a third power consumption mode and a fourth power consumption mode to keep power consumption lower than the third power consumption mode, the information storage device including: a power management control means for controlling transition of the power consumption mode of the power management mechanism of the interface based on the current power consumption mode of the internal power management mechanism.

According to a second aspect of the present invention, there is provided an information recording/reproducing device having a host computer and an information storage device connected to each other via an interface, the interface being provided with a power management mechanism having a first power consumption mode and a second power consumption mode to keep power consumption lower than the first power consumption mode, and the information storage device being provided with an internal power management mechanism having a third power consumption mode and a fourth power consumption mode to keep power consumption lower than the third power consumption mode, in which the information storage device including a power management control means for controlling transition of the power consumption mode of the power management mechanism of the interface based on the current power consumption mode of the internal power management mechanism.

According to a third aspect of the present invention, there is provided a power consumption management method in an information recording/reproducing device having a host computer and an information storage device, in which a power management mechanism of an interface connecting the host computer and information storage device has a first power consumption mode and a second power consumption mode to keep power consumption lower than the first power consumption mode, an internal power management mechanism of the information storage device has a third power consumption mode and a fourth power consumption mode to keep power consumption lower than the third power consumption mode, and the information storage device controls transition of the power consumption mode of the power management mechanism of the interface based on the current power consumption mode of the internal power management mechanism.

BRIEF DESCRIPTION OF THE DRAWINGS

FIG. 5(a) is a table showing transition conditions of the power consumption mode of the serial ATA interface of the information recording/reproducing device according to the embodiment of the present invention, transition timings thereof, and transition destinations thereof, and FIG. 5(b) is a table showing another examples of the transition conditions of the power consumption mode of the serial ATA interface of the information recording/reproducing device according to the embodiment of the present invention, transition timings thereof, and transition destinations thereof, respectively;

DESCRIPTION OF SYMBOLS

1: Optical disc drive unit
2: Host computer
3: Optical disc
10: Information recording/reproducing device
101: Spindle motor
102: Optical pickup
103: Signal recording/reproducing section
104, 203: Memory
105, 204: CPU
106, 205: I/F section
201: Operation section
202: Display section
S1: Part managed by power management mechanism of optical disc drive unit
S2: Part managed by power management mechanism of serial ATA interface

BEST MODES FOR CARRYING OUT THE INVENTION

Embodiments of the present invention will be described below with reference to the accompanying drawings.

<Configuration>

Figure 2:
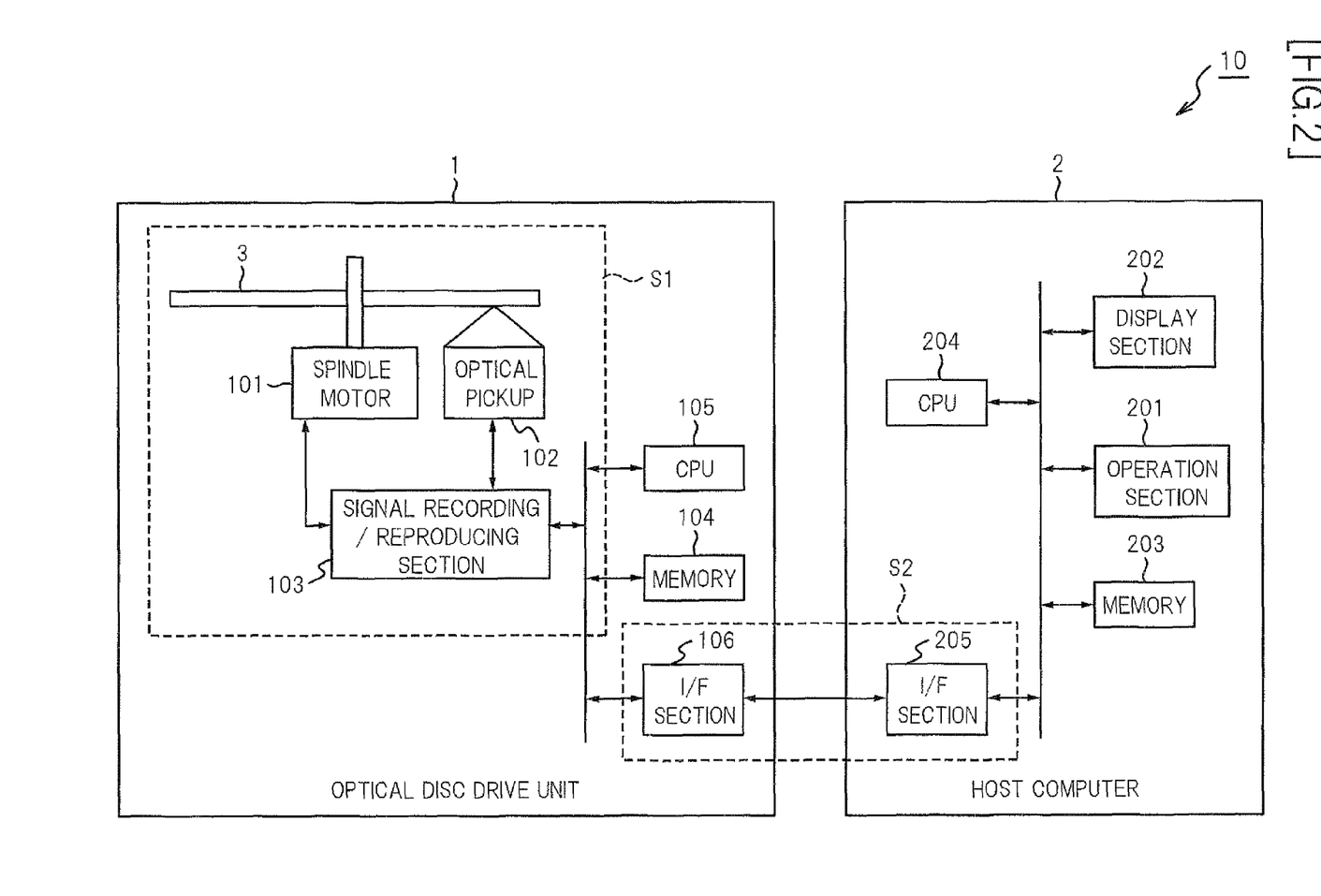
FIG. 2 is a view showing a schematic configuration of an information recording/reproducing device according to an embodiment of the present invention.

FIG. 2 is a view showing a schematic configuration of an information recording/reproducing device 10 according to an embodiment of the present invention. The information recording/reproducing device 10 has functions of recording data on an optical disc 3 serving as an information recording medium and reproducing data recorded on the optical disc 3. Examples of the information recording/reproducing device 10 include a computer provided with a DVD (Digital Versatile Disc) drive unit, a DVD recorder, and the like. The information recording/reproducing device 10 may have only one of the functions of recording data on the optical disc 3 and reproducing data recorded on the optical disc 3, and the DVD player, etc., corresponds to the latter case.

As shown in FIG. 2, the information recording/reproducing device 10 includes an optical disc drive unit 1 that loads the optical disc 3 and records/reproduces data on/from the optical disc 3 and a host computer 2 that controls the data recording/reproducing operation of the optical disc drive unit 1. That is, in the information recording/reproducing device 10, the optical disc drive unit 1 reproduces data recorded on the optical disc 3 in response to a request from the host computer 2 and records data on the optical disc 3 in response to a request from the host computer 2. By loading the optical disc 3, the optical disc drive unit 1 has a function as an information storage device that stores contents to be recorded or reproduced.

Specifically, a DVD can be taken as an example of the optical disc 3, and a DVD (Digital Versatile Disc) drive unit can be taken as an example of the optical disc drive unit 1.

The interface used between the optical disc drive unit 1 and host computer 2 in the present embodiment is a serial ATA interface. Thus, the optical disc drive unit 1 and host computer 2 are connected by a simple serial ATA cable, and high-speed data transfer is achieved in communication between the optical disc drive unit 1 and host computer 2.

The optical disc drive unit 1 includes a spindle motor 101, an optical pickup 102, a signal recording/reproducing section 103, a memory 104, a CPU 105, and an interface (hereinafter, referred to as "I/F") section 106.

The spindle motor 101 is a mechanism that drives and stops the rotation of the optical disc 3, and it operates at the time when the optical disc 3 is accessed. More specifically, the spindle motor 101 is configured to rotate the optical disc 3 at a predetermined speed and stop the rotation thereof while receiving a spindle servo by a not-shown servo unit, etc.

The optical pickup 102 is a mechanism that irradiates the loaded optical disc 3 with laser light in a focusing manner and is constituted by, e.g., a not-shown semiconductor laser element, a not-shown collimator lens, a not-shown objective lens, and the like. When reading a signal recorded on the optical disc 3, the optical pickup 102 irradiates the optical disc 3 with laser light, converts reflected light from the optical disc 3 into an electrical signal, and outputs the electrical signal to the signal recording/reproducing section 103.

The signal recording/reproducing section 103 controls the spindle motor 101 and optical pickup 102 under the control of the CPU 105 to perform recording/reproducing on/from the optical disc 3. More specifically, the signal recording/reproducing section 103 is constituted by a laser diode driver (LD driver), a head amplifier, and the like. The LD driver generates a drive pulse and drives a semiconductor laser element provided in the optical pickup 102, and the head amplifier amplifies the output signal from the optical pickup 102.

The memory 104 is a data storage area used in overall data processing performed in the optical disc drive unit 1 and is constituted by a ROM area that stores various programs and various data for allowing the optical disc drive unit 1 to operate, a RAM area serving as a temporary storage buffer for temporarily storing data to be recorded/reproduced, and the like. For example, in the present embodiment, a power consumption mode control program that controls the transition of the power consumption mode of the interface depending on the state of the drive is stored in the ROM area. This program may be stored not only in the memory 104 but also in a computer-readable recording medium such as a flash memory, a CD-ROM, an MO, and a DVD-ROM. Further, the program may be delivered through a communication network.

The CPU 105 controls the entire operation of the optical disc drive unit 1 according to a program stored in the memory 104. For example, the CPU 105 in the present embodiment makes the optical disc drive unit 1 execute the above power consumption mode control program to thereby allowing the transition of the power consumption mode of the interface to be controlled depending on the state of the drive.

The I/F section 106 is an interface connected to the host computer 2 and controls communication between the optical disc drive unit 1 and host computer 2. In the present embodiment, the serial ATA interface is adopted as the I/F section 106 as described above.

The host computer 2 may be, e.g., a personal computer or a workstation and includes an operation section 201, a display section 202, a memory 203, a CPU 204, and an interface (hereinafter, referred to as "I/F") section 205.

The operation section 201 is provided with a plurality of keys for inputting numerals, characters, operation instructions and outputs an operation signal corresponding to the key operation to the CPU 204.

The display section 202 has a display medium, such as a liquid crystal display panel or a CRT display, that displays information and a drive circuit that controls display operation of the display medium.

The memory 203 is constituted by, e.g., a ROM, a RAM, a hard disc drive, and the like and stores various programs and various data to be executed by the CPU 204.

The CPU 204 performs control of components in the host computer 2, data transmission, various calculations, temporary storage of data, and the like.

The I/F section 205 is an interface connected to the optical disc drive unit 1 and controls communication between the optical disc drive unit 1 and host computer 2. In the present embodiment, the serial ATA interface is adopted as the I/F section 205 as described above.

<Power Management Mechanism>

Next, a power management mechanism of the information recording/reproducing device 10 will be described.

Figure 3:
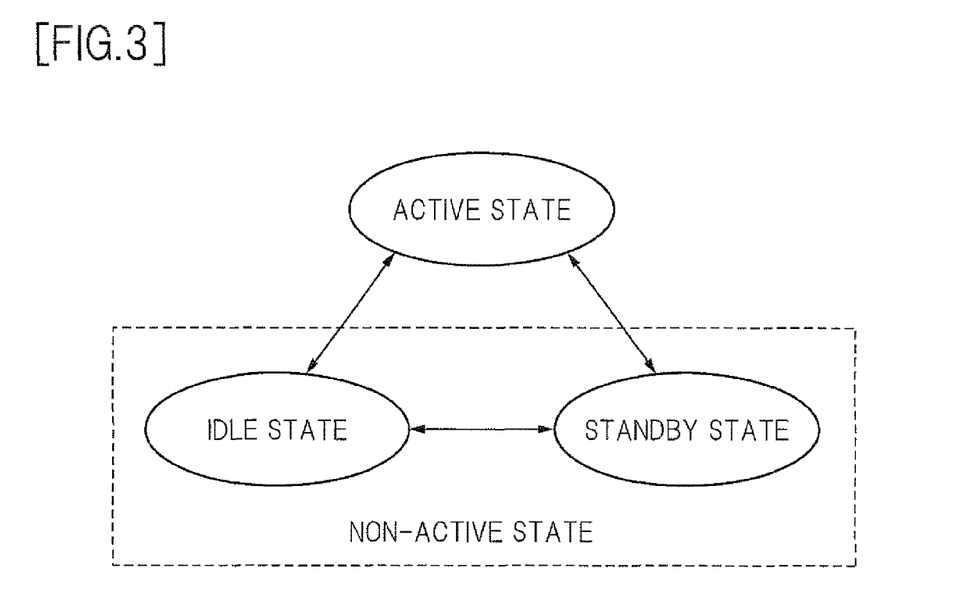
FIG. 3 is a conceptual view showing a power consumption mode of an optical disc drive unit according to the embodiment of the present invention and transition of the power consumption mode.

With reference to FIG. 3, a power management mechanism inside the optical disc drive unit 1 will be described first. FIG. 3 is a conceptual view showing the power consumption mode in the optical disc drive unit 1 and transition of the power consumption mode. The power management mechanism inside the optical disc drive unit 1 manages the power consumption in the optical disc drive part within the S1 area of FIG. 2.

The power consumption mode of the optical disc drive unit 1 includes an Active state, an Idle state, and a Standby state in accordance with the drive state of the optical disc drive unit 1. The Active state is a state where the optical disc 3 is rotated at high speed, i.e., a state where data read/write operation can be performed immediately. Upon receiving a disc access command from the host computer 2, the optical disc drive unit 1 enters the Active state. The Idle state is set when a state where no disc access command is received continues for 20 seconds in the Active state. Upon transition to the Idle state, the rotation speed of the optical disc 3 is reduced, and the optical disc 3 is rotated at low speed during the Idle state. The Standby state is set when a state where no disc access command is received continues for 8 minutes in the Idle state. In the Standby state, the rotation of the optical disc 3 is stopped. As described above, the power consumption mode of the optical disc drive unit 1 is associated with the operating state of the drive of the optical disc drive unit 1.

The Idle state and Standby state are lower in the power consumption than the Active state. In the present embodiment, the Idle state and Standby state are collectively referred to as "Non-active state", relative to the Active state. The Non-active state corresponds to the power saving mode in the power consumption mode of the optical disc drive unit 1.

Figure 4:
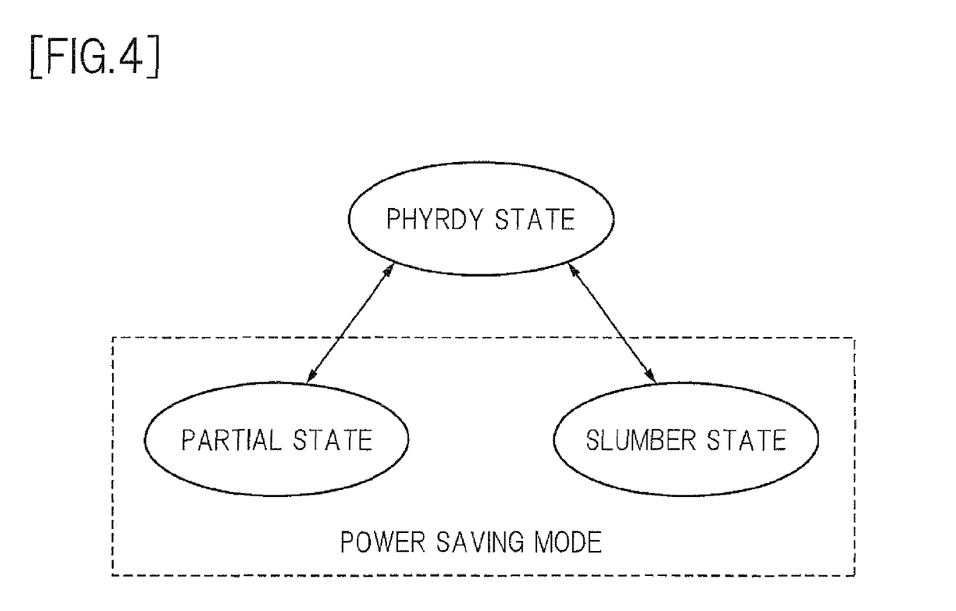
FIG. 4 is a conceptual view showing a power consumption mode of a serial ATA interface of the information recording/reproducing device according to the embodiment of the present invention and transition of the power consumption mode.

Next, with reference to FIG. 4, a power management mechanism of the serial ATA interface will be described. FIG. 4 is a conceptual view showing the power consumption mode in the serial ATA interface and transition of the power consumption mode. The power management mechanism of the serial ATA interface manages the power consumption in the interface part within the S2 area of FIG. 2.

As described in the section of "Background Art", the power consumption mode of the serial ATA interface includes a PHYRDY state, a Partial state, and a Slumber state. In the Partial state and Slumber state, operation of the interface circuit is stopped and therefore communication is disabled, while in the PHYRDY state, communication is enabled. The power consumption becomes lower in order of PHYRDY state, Partial state, and Slumber state. The Partial state and Slumber state correspond to the power saving mode in the power consumption mode of the serial ATA interface. As described above, the time required for transition from the Partial state to the PHYRDY state is up to 10 μsec, and time required for transition from the Slumber state to the PHYRDY state is up to 10 msec. When the power consumption mode shifts from the Partial state to the Slumber state, it does not shift directly from the Partial state to the Slumber state but shifts to the Slumber state through the PHYRDY state.

In the power management mechanism of the serial ATA interface of the present embodiment, the optical disc drive unit 1 controls the transition of the power consumption mode of the serial ATA interface based on the power consumption mode of the optical disc drive unit 1 itself. This control operation will be described in detail with reference to FIG. 5(a). FIG. 5(a) is a table showing transition conditions of the power consumption mode of the serial ATA interface, transition timings thereof, and transition destinations thereof.

Case Where Drive is in Active State

In the case where the power consumption mode of the optical disc drive unit 1 is the Active state and where the power consumption mode of the serial ATA interface is the PHYRDY state, the power consumption mode of the serial ATA interface is made to shift from the PHYRDY state to Partial state 100 msec after the previous command reception if a state where no command is received continues for 100 msec after the reception of the previous command. That is, if a state where no command is received continues for 100 msec in the PHYRDY state, the power consumption mode shifts to the Partial state.

In the case where the power consumption mode of the optical disc drive unit 1 is the Active state and where the power consumption mode of the serial ATA interface is the Partial state, the power consumption mode of the serial ATA interface is made to shift from the Partial state to Slumber state 100 msec after completion of the transition to the Partial state if a state where no command is received continues for 100 msec after the completion of the transition to the Partial state. That is, if a state where no command is received continues for 200 msec in the PHYRDY state, the power consumption mode shifts from the Partial state to the Slumber state.

In the case where the power consumption mode of the optical disc drive unit 1 is the Active state, for example, while the host computer 2 is reproducing video content, the optical disc drive unit 1 reads out data stored in the optical disc 3 at several 10-msec intervals according to an instruction from the host computer 2 and transmits the read out data to the host computer 2. In such a case, the optical disc drive unit 1 continually accesses the optical disc 3, so that it is desirable that the power consumption mode of the serial ATA interface be not allowed to shift to the power saving mode but allowed to reside in the PHYRDY state. Therefore, in the present embodiment, a threshold (100 msec) as the transition condition from the PHYRDY state to the Partial state is set longer than the access interval (several 10 msec) to the optical disc 3 (however, shorter than 500 msec or 2,500 msec in the conventional technique).

Case Where Drive is in Non-Active State

In the case where the power consumption mode of the optical disc drive unit 1 is the Non-active state and where the power consumption mode of the serial ATA interface is the PHYRDY state, the power consumption mode of the serial ATA interface is made to shift from the PHYRDY state to the Partial state 1 msec after the previous command reception if a state where no command is received continues for 1 msec after the reception of the previous command. That is, if a state where no command is received continues for 1 msec in the PHYRDY state, the power consumption mode shifts to the Partial state.

In the case where the power consumption mode of the optical disc drive unit 1 is the Non-active state and where the power consumption mode of the serial ATA interface is the Partial state, the power consumption mode of the serial ATA interface is made to shift from the Partial state to Slumber state 1 msec after completion of the transition to the Partial state if a state where no command is received continues for 1 msec after the completion of the transition to the Partial state. That is, if a state where no command is received continues for 2 msec in the PHYRDY state, the power consumption mode shifts from the Partial state to the Slumber state.

In the case where the power consumption mode of the optical disc drive unit 1 is Non-active state, for example, while the host computer 2 performs no processing at all, the host computer 2 transmits a command for checking the state of the drive at one-second intervals and, accordingly, the optical disc drive unit 1 receives this command at one-second intervals. In such a case, the optical disc drive unit 1 does not access the optical disc 3, so that it is desirable that the power consumption mode of the serial ATA interface be allowed to shift to the power saving mode as fast as possible. More specifically, it is desirable that the power consumption mode be allowed to shift from the PHYRDY state to the Partial state and further to the Slumber state as fast as possible. Therefore, in the present embodiment, thresholds as the transition condition from the PHYRDY state to the Partial state and that from the Partial state to the Slumber state are set to 1 msec.

The thresholds (100 msec, 1 msec) of the transition conditions in the table of FIG. 5(a) are merely preferred examples, and the concrete value of the threshold is not limited to these values.

As described above, according to the power management mechanism of the serial ATA interface of the present embodiment, the optical disc drive unit 1 can control the transition of the power consumption mode of the serial ATA interface based on the power consumption mode of the optical disc drive unit 1 itself. Thus, when the drive is in the Active state, the serial ATA interface does not enter the power saving mode immediately, so that communication performance between the optical disc drive unit 1 and host computer 2 does not decrease. Further, when the drive is in the Non-active state, the serial ATA interface enters the power saving mode immediately, thereby allowing a reduction in the power consumption of the interface between the optical disc drive unit 1 and host computer 2.

Figure 6:
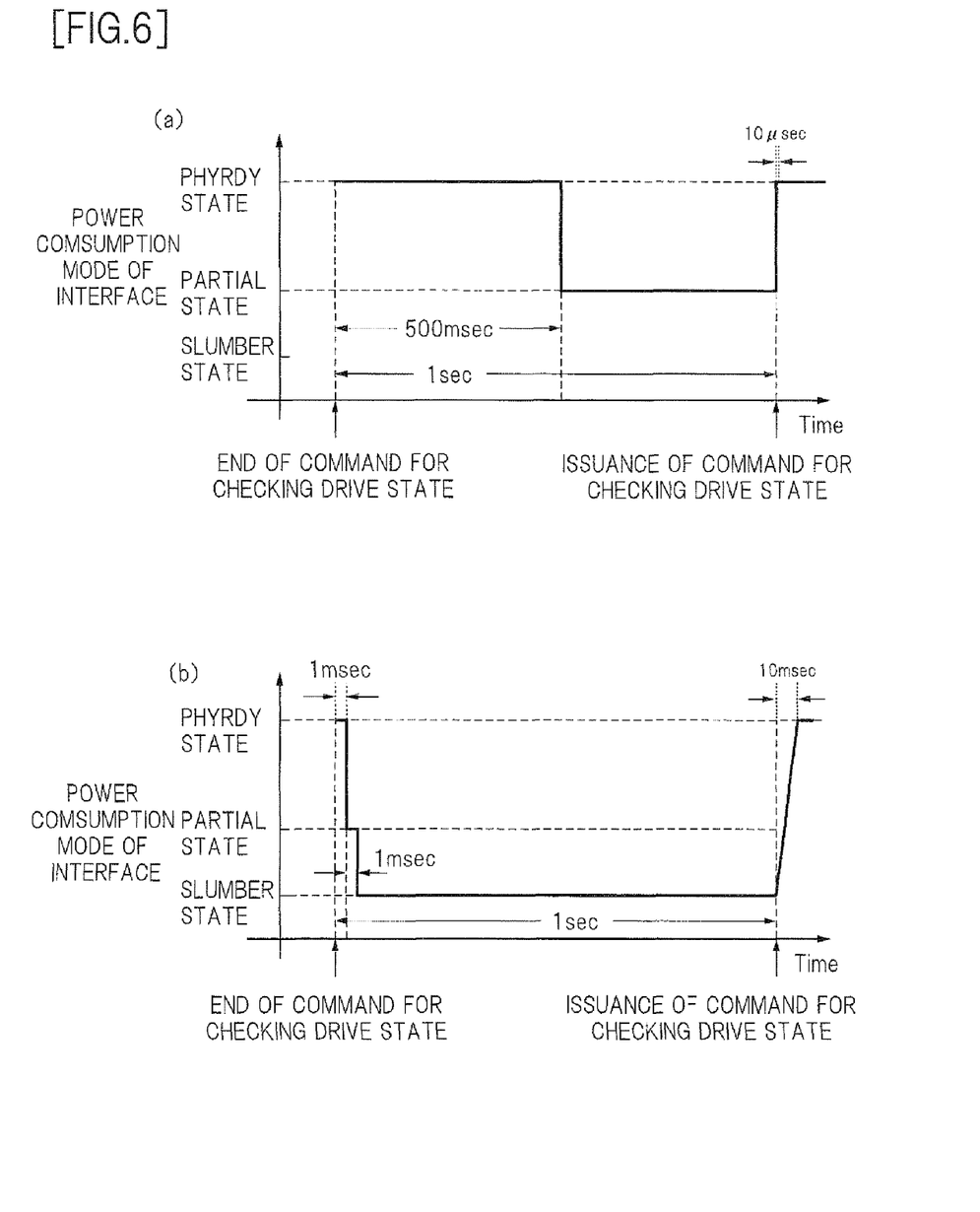
FIG. 6(a) is a time chart showing the transition of the power consumption mode of the serial ATA interface of a conventional technique in the case where the drive is in an Non-active state.
FIG. 6(b) is a time chart showing the transition of the power consumption mode of the serial ATA interface of the present embodiment in the case where the drive is in the Non-active state.

Here, with reference to FIG. 6, a reduction effect of the power consumption of the serial ATA interface in the case where the drive is in the Non-active state will be concretely verified. FIG. 6 is a time chart showing the transition of the power consumption mode of the serial ATA interface in the case where the drive is in a Non-active state. FIG. 6(*a*) shows the power consumption mode of the serial ATA interface in a conventional technique, and FIG. 6(*b*) shows the transition of the power consumption mode of the serial ATA interface in the present embodiment.

In a conventional technique, as shown in FIG. 6(*a*), it takes 500 msec from the command reception to complete transition from the PHYRDY state to the Partial state, so that the Partial state continues only for 500 msec which is half of one second measured from the previous command reception to next command reception.

On the other hand, in the present embodiment, it takes only 1 msec from the command reception to complete transition from the PHYRDY state to the Partial state and it takes only another 1 msec to complete transition from the Partial state to the Slumber state as shown in FIG. 6(*b*), so that the power saving mode continues for 999 msec of one second measured from the previous command reception to next command reception.

As described above, when the drive is in the Non-active state, the time period during which the power saving mode continues is about twice as long as that in the conventional technique. Thus, it can be said that the reduction effect of the power consumption of the interface in the present embodiment is significantly larger than in the conventional technique.

<Operation>

Figure 7:
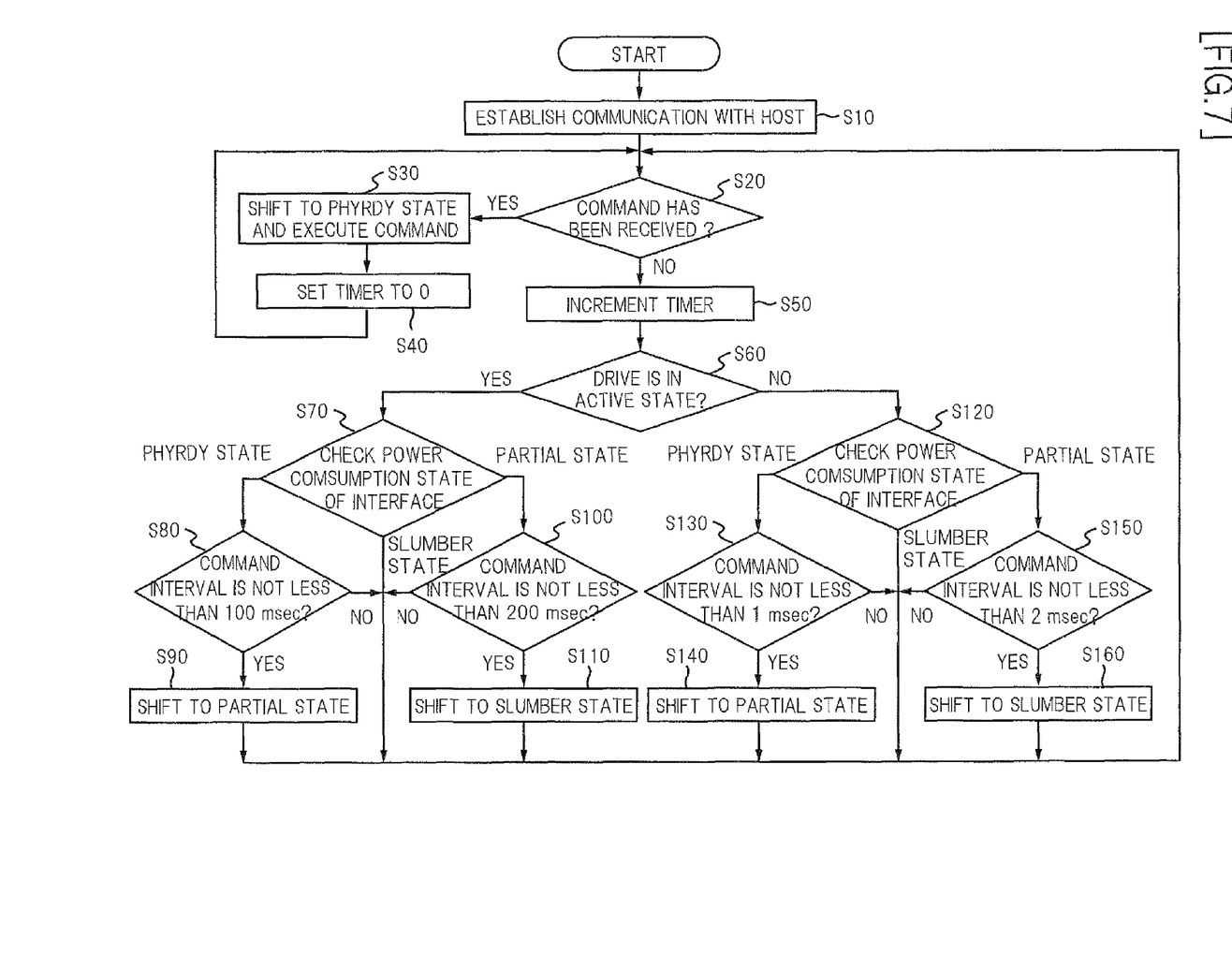
FIG. 7 is a flowchart showing a flow of processing in which the optical disc drive unit according to the embodiment of the present invention controls the power consumption mode of the serial ATA interface.

Next, with reference to FIG. 7, operation of the optical disc drive unit 1 of the information recording/reproducing device 10 according to the present embodiment will be described. FIG. 7 is a flowchart showing a flow of processing in which the optical disc drive unit 1 controls the power consumption mode of the serial ATA interface. The processing shown in FIG. 7 is carried out by the CPU 105 of the optical disc drive unit 1.

The optical disc drive unit 1 establishes communication with the host computer 2 through the I/F section 106 (step S10) and determines whether a command has been received from the host computer 2 (step S20).

When determining that a command has been received from the host computer 2 (step S20: YES), the optical disc drive unit 1 executes the received command (step S30). For example, when receiving a command for checking the drive state, the optical disc drive unit 1 checks the state of its own drive; when receiving a READ command for reading the optical disc 3, the optical disc drive unit 1 accesses the optical disc 3 and reads out information from the optical disc 3. In the case where the power consumption mode of the serial ATA interface is not the PHYRDY state, that is, in the case where the power consumption mode of the serial ATA interface is the power saving mode (the Partial state or the Slumber state), the optical disc drive unit 1 executes the command after shifting the power consumption mode from the power saving mode to the PHYRDY state (step S30). That is, the command reception serves as a trigger for the power consumption mode of the serial ATA interface to shift from the power saving mode to the PHYRDY state. Subsequently, after executing the command, the optical disc drive unit 1 sets a timer for counting a command issuance interval to 0 (step S40). In the present embodiment, the optical disc drive unit 1 sets the timer for counting a command issuance interval to 0 at the reception timing of a command from the host computer 2.

When determining that a command has not been received from the host computer 2 (step S20: NO), the optical disc drive unit 1 increments the timer for counting a command issuance interval (step S50) and checks the drive state, i.e., the power consumption mode of the optical disc drive unit 1 itself (step S60).

When determining the power consumption mode of the optical disc drive unit 1 itself is the Active state (step S60: YES), the optical disc drive unit 1 checks the power consumption state of the interface, that is, the power consumption mode of the serial ATA interface (step S70).

When determining the power consumption mode of the serial ATA interface is the PHYRDY state (step S70: PHYRDY state), the optical disc drive unit 1 refers to the timer for counting a command issuance interval to determine whether the command issuance interval is not less than 100 msec (step S80). When determining that the command issuance interval is not less than 100 msec (step S80: YES), the optical disc drive unit 1 shifts the power consumption mode of the serial ATA interface from the PHYRDY state to the Partial state (step S90). When determining that the command issuance interval is less than 100 msec (step S80: NO), the optical disc drive unit 1 does not execute processing concerning the state transition but returns to step S20 described above.

When determining the power consumption mode of the serial ATA interface is the Partial state (step S70: Partial state), the optical disc drive unit 1 refers to the timer for counting a command issuance interval to determine whether the command issuance interval is not less than 200 msec (step S100). When determining that the command issuance interval is not less than 200 msec (step S100: YES), the optical disc drive unit 1 shifts the power consumption mode of the serial ATA interface from the Partial state to the Slumber state (step S110). When determining that the command issuance interval is less than 200 msec (step S100: NO), the optical disc drive unit 1 does not execute processing concerning the state transition but returns to step S20 described above.

When determining the power consumption mode of the serial ATA interface is the Slumber state (step S70: Slumber state), the optical disc drive unit 1 does not execute processing concerning the state transition but returns to step S20 described above.

When determining the power consumption mode of the optical disc drive unit 1 itself is the Non-active state (step S60: NO), the optical disc drive unit 1 checks the power consumption state of the interface, that is, the power consumption mode of the serial ATA interface (step S120).

When determining the power consumption mode of the serial ATA interface is the PHYRDY state (step S120: PHYRDY state), the optical disc drive unit 1 refers to the timer for counting a command issuance interval to determine whether the command issuance interval is not less than 1 msec (step S130). When determining that the command issuance interval is not less than 1 msec (step S130: YES), the optical disc drive unit 1 shifts the power consumption mode of the serial ATA interface from the PHYRDY state to the Partial state (step S140). When determining that the command issuance interval is less than 1 msec (step S130: NO), the optical disc drive unit 1 does not execute processing concerning the state transition but returns to step S20 described above.

When determining the power consumption mode of the serial ATA interface is the Partial state (step S120: Partial state), the optical disc drive unit 1 refers to the timer for counting a command issuance interval to determine whether the command issuance interval is not less than 2 msec (step S150). When determining that the command issuance interval is not less than 2 msec (step S150: YES), the optical disc drive unit 1 shifts the power consumption mode of the serial ATA interface from the Partial state to the Slumber state (step S160). When determining that the command issuance interval is less than 2 msec (step S150: NO), the optical disc drive unit 1 does not execute processing concerning the state transition but returns to step S20 described above.

When determining the power consumption mode of the serial ATA interface is the Slumber state (step S120: Slumber state), the optical disc drive unit 1 does not execute processing concerning the state transition but returns to step S20 described above.

Thus, according to the information recording/reproducing device 10 of the present embodiment, in the configuration in which the optical disc drive unit 1 and host computer 2 are connected by the serial ATA interface, the optical disc drive unit 1 flexibly controls the transition of the power consumption of the serial ATA interface based on the drive state (power consumption mode of the optical disc drive unit 1) to thereby allow a significant reduction of the power consumption of the serial ATA interface without adversely affecting the communication between the optical disc drive unit 1 and host computer 2.

More specifically, the serial ATA interface does not enter the power saving mode immediately when the drive is in the Active state, so that the communication performance between the optical disc drive unit 1 and host computer 2 does not decrease. On the other hand, the serial ATA interface enters the power saving mode immediately when the drive is in the Non-active state, so that the power consumption of the serial ATA interface can significantly be reduced.

Further, according to the information recording/reproducing device 10 of the present embodiment, adoption of the configuration in which the power consumption mode of the serial ATA interface is controlled by the optical disc drive unit 1 side eliminates the need to modify the specification of the host computer 2. That is, it is possible to reduce the power consumption of the serial ATA interface significantly without a use of an asynchronous event notification mechanism (Asynchronous Notification) as described in the section of "Background Art".

Another Embodiment

In the present embodiment, the transition of the power consumption mode of the serial ATA interface is controlled based on the drive state. However, the transition conditions of the power consumption mode, transition timing thereof, and transition destination thereof are not limited to those shown in the table of FIG. 5(*a*) but may be variously modified. For example, in the table of FIG. 5(*a*), the transition time to the power saving mode is changed depending on whether the drive state is in the Active state or Non-active state; alternatively, however, as shown in the table of FIG. 5(*b*), the power saving mode of the transition destination may be changed depending on whether the drive state is in the Active state or Non-active state.

This modification will be described in detail using FIG. 5(*b*). FIG. 5(*b*) is a table showing transition conditions of the power consumption mode of the serial ATA interface, transition timings thereof, and transition destinations thereof in this modification.

Case Where Drive is in Active State

In the case where the power consumption mode of the optical disc drive unit 1 is the Active state and where the power consumption mode of the serial ATA interface is the PHYRDY state, the power consumption mode of the serial ATA interface is made to shift from the PHYRDY state to the Partial state 5 msec after the previous command reception if a state where no command is received continues for 5 msec after the reception of the previous command. That is, if a state where no command is received continues for 5 msec in the PHYRDY state, the power consumption mode shifts to the Partial state.

Case Where Drive is in Non-Active State

In the case where the power consumption mode of the optical disc drive unit 1 is the Non-active state and where the power consumption mode of the serial ATA interface is the PHYRDY state, the power consumption mode of the serial ATA interface is made to shift from the PHYRDY state to the Slumber state 5 msec after the previous command reception if a state where no command is received continues for 5 msec after the reception of the previous command. That is, if a state where no command is received continues for 5 msec in the PHYRDY state, the power consumption mode shifts to the Slumber state.

The threshold (5 msec) of the transition condition in the table of FIG. 5(*b*) is merely a preferred example, and the concrete value of the threshold is not limited to this value. Further, although the threshold of the transition condition between the Active state and Non-active state of the drive is set to the same value in the table of FIG. 5(*b*), different thresholds may be set as the transition condition between the Active state and Non-active state of the drive. For example, the threshold of the transition condition in the Non-active state of the drive may be set to a smaller value than the threshold of the transition condition in the Active state of the drive.

Figure 8:
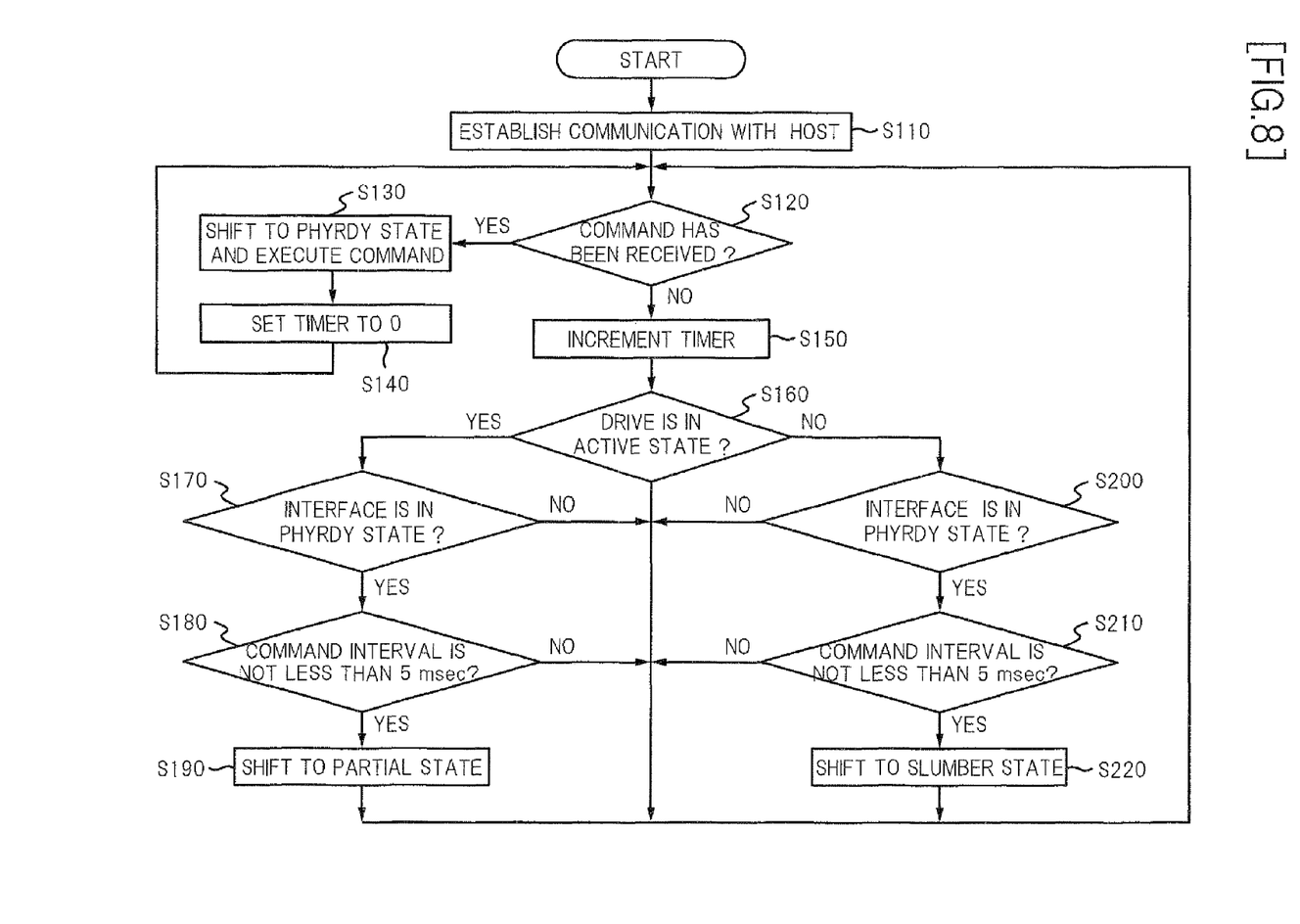
FIG. 8 is a flowchart showing a modification of the processing flow in which the optical disc drive unit according to the embodiment of the present invention controls the power consumption mode of the serial ATA interface.

FIG. 8 is a flowchart showing a processing flow in this modification in which the optical disc drive unit 1 controls the power consumption mode of the serial ATA interface. The processing shown in FIG. 8 is carried out by the CPU 105 of the optical disc drive unit 1.

The optical disc drive unit 1 establishes communication with the host computer 2 through the I/F section 106 (step S110) and determines whether a command has been received from the host computer 2 (step S120).

When determining that a command has been received from the host computer 2 (step S120: YES), the optical disc drive unit 1 executes the received command (step S130). In the case where the power consumption mode of the serial ATA interface is not the PHYRDY state, that is, in the case where the power consumption mode of the serial ATA interface is the power saving mode (the Partial state or the Slumber state), the optical disc drive unit 1 executes the command after shifting the power consumption mode from the power saving mode to the PHYRDY state (step S130). After executing the command, the optical disc drive unit 1 sets the timer for counting a command issuance interval to 0 (step S140). In this modification, the optical disc drive unit 1 sets the timer for counting a command issuance interval to 0 at the reception timing of a command from the host computer 2.

When determining that a command has not been received from the host computer 2 (step S120: NO), the optical disc drive unit 1 increments the timer for counting a command issuance interval (step S150) and checks the drive state, i.e., the power consumption mode of the optical disc drive unit 1 itself (step S160).

When determining the power consumption mode of the optical disc drive unit 1 itself is the Active state (step S160: YES), the optical disc drive unit 1 checks whether the power consumption state of the interface, i.e., the power consumption mode of the serial ATA interface is the PHYRDY state (step S170). When determining the power consumption mode of the serial ATA interface is the PHYRDY state (step S170:

YES), the optical disc drive unit 1 refers to the timer for counting a command issuance interval to determine whether the command issuance interval is not less than 5 msec (step S180). When determining that the command issuance interval is not less than 5 msec (step S180: YES), the optical disc drive unit 1 shifts the power consumption mode of the serial ATA interface from the PHYRDY state to the Partial state (step S190). When determining that the power consumption mode of the serial ATA interface is not the PHYRDY state (S170: NO), or determining that the power consumption mode of the serial ATA interface is the PHYRDY state and the command issuance interval is less than 5 msec (step S180: NO), the optical disc drive unit 1 does not execute processing concerning the state transition but returns to step S120.

When determining the power consumption mode of the optical disc drive unit 1 itself is the Non-active state (step S160: NO), the optical disc drive unit 1 checks whether the power consumption state of the interface, i.e., the power consumption mode of the serial ATA interface is the PHYRDY state (step S200). When determining the power consumption mode of the serial ATA interface is the PHYRDY state (step S200: YES), the optical disc drive unit 1 refers to the timer for counting a command issuance interval to determine whether the command issuance interval is not less than 5 msec (step S210). When determining that the command issuance interval is not less than 5 msec (step S210: YES), the optical disc drive unit 1 shifts the power consumption mode of the serial ATA interface from the PHYRDY state to the Slumber state (step S220). When determining that the power consumption mode of the serial ATA interface is not the PHYRDY state (S200: NO), or determining that the power consumption mode of the serial ATA interface is the PHYRDY state and the command issuance interval is less than 5 msec (step S210: NO), the optical disc drive unit 1 does not execute processing concerning the state transition but returns to step S120.

When determining the power consumption mode of the serial ATA interface is the Slumber state (step S160: Slumber state), the optical disc drive unit 1 does not execute processing concerning the state transition but returns to step S120.

As described above, a configuration may be adopted in which when the drive is in the Active state, the power consumption mode of the serial ATA interface is made to shift to the low power saving mode upon establishment of a predetermined condition; on the other hand, when the drive is in the Non-active state, the power consumption mode of the serial ATA interface is made to shift to the high power saving mode upon establishment of a predetermined condition.

Further, although the serial ATA interface is used to connect the optical disc drive unit 1 and host computer 2 in the above embodiment, it may be used to connect another information storage device, such as a hard disk driver, and host computer 2 so as to reduce the power consumption of the serial ATA interface. In this case, the transition condition of the state transition of the serial ATA interface may be changed depending on whether the recording head of the hard disk driver is retreated or not, although the transition condition of the state transition of the serial ATA interface is changed depending on whether the drive is in the Active state or Non-active state in the above embodiment.

Further, although the serial ATA interface is taken as an example of the interface for connecting the optical disc drive unit 1 and host computer 2, the present invention is not limited to this, but another interface, such as USB 3.0 or SCSI attached Serial Interface, may be used.

As described above, the information recording/reproducing device according to the embodiment of the present invention includes the optical disc drive unit 1 and host computer 2. The power management mechanism of the serial ATA interface connecting the optical disc drive unit 1 and host computer 2 has a steady-state power mode (PHYRDY state) and a power saving mode (Partial state, Slumber state) to keep power consumption lower than the steady-state power mode, while a power management mechanism built into the optical disc drive unit 1 has a steady-state power mode (Active state) and a power saving mode (Non-active state) to keep power consumption lower than the steady-state power mode. The optical disc drive unit 1 controls the transition of the power consumption mode of the power management mechanism of the serial ATA interface based on the current power consumption mode of the power management mechanism of the optical disc drive unit 1 to thereby allow a significant reduction of the power consumption of the serial ATA interface without adversely affecting the communication between the optical disc drive unit 1 and host computer 2.

Although the embodiment of the present invention has been described, it should be understood that the present invention is not limited to the above embodiment. Thus, various modifications and applications may be made without departing from the scope of the invention, and all of the modifications and alternations thereof are included in the technical scope of the present invention.

The invention claimed is:

1. An information storage device in an information recording/reproducing device that has a host computer and an information storage device connected to each other via an interface, the interface being provided with a power management mechanism having a first power consumption mode and a second power consumption mode to keep power consumption lower than the first power consumption mode, and the information storage device being provided with an internal power management mechanism having a third power consumption mode and a fourth power consumption mode to keep power consumption lower than the third power consumption mode, the device information storage comprising:

power management control means for controlling transition of the power consumption mode of the power management mechanism of the interface based on the current power consumption mode of the internal power management mechanism, wherein, when the power consumption mode of the internal power management mechanism is the third power consumption mode, the power management control means shifts the power consumption mode of the power management mechanism of the interface from the first power consumption mode to the second power consumption mode after the lapse of a first time period from the termination of communication with the host computer, and when the power consumption mode of the internal power management mechanism is the fourth power consumption mode, the power management control means shifts the power consumption mode of the power management mechanism of the interface from the first power consumption mode to the second power consumption mode after the lapse of a second time period shorter than the first time period from the termination of communication with the host computer.

2. The information storage device according to claim 1, wherein the second power consumption mode has a first power saving mode and a second power saving mode to keep power consumption lower than the first power saving mode, and when the power consumption mode of the internal power management mechanism is the third power consumption mode, the power management control means shifts the power consumption mode of the power management mechanism of the interface from the first power consumption mode to the first power saving mode after the lapse of the first time period from the termination of communication with the host computer and shifts the power consumption mode of the power management mechanism of the interface from the first power saving mode to the second power saving mode after the lapse of the first time period from the termination of the communication with the host computer in the first power saving mode; and when the power consumption mode of the internal power management mechanism is the fourth power consumption mode, the power management control means shifts the power consumption mode of the power management mechanism of the interface from the first power consumption mode to the first power saving mode after the lapse of the second time period from the termination of communication with the host computer and shifts the power consumption mode of the power management mechanism of the interface from the first power saving mode to the second power saving mode after the lapse of the second time period from the termination of the communication with the host computer in the first power saving mode.

3. The information storage device according to claim 1, wherein the first power consumption mode is a state where communication between the host computer and information storage device is enabled, and the second power consumption mode is a state where the host computer and information storage device is disabled, and the third power consumption mode is a state where the information storage device can access data immediately, and the fourth power consumption mode is a state where the information storage device cannot access data immediately.

4. An information recording/reproducing device comprising the information storage device as claimed in claim 1.

5. An information storage device in an information recording/reproducing device that has a host computer and an information storage device connected to each other via an interface, the interface being provided with a power management mechanism having a first power consumption mode and a second power consumption mode to keep power consumption lower than the first power consumption mode, and the information storage device being provided with an internal power management mechanism having a third power consumption mode and a fourth power consumption mode to keep power consumption lower than the third power consumption mode, the device information storage comprising:

power management control means for controlling transition of the power consumption mode of the power management mechanism of the interface based on the current power consumption mode of the internal power management mechanism, wherein the second power consumption mode has a first power saving mode and a second power saving mode to keep power consumption lower than the first power saving mode, and when the power consumption mode of the internal power management mechanism is the third power consumption mode, the power management control means shifts the power consumption mode of the power management mechanism of the interface from the first power consumption mode to the first power saving mode after the lapse of the first time period from the termination of communication with the host computer; and when the power consumption mode of the internal power management mechanism is the fourth power consumption mode, the power management control means shifts the power consumption mode of the power management mechanism of the interface from the first power consumption mode to the second power saving mode after the lapse of the first time period or a second time period shorter than the first time period from the termination of communication with the host computer.

6. A power consumption management method in an information recording/reproducing device having a host computer and an information storage device, wherein a power management mechanism of an interface connecting the host computer and the information storage device has a first power consumption mode and a second power consumption mode to keep power consumption lower than the first power consumption mode, an internal power management mechanism of the information storage device has a third power consumption mode and a fourth power consumption mode to keep power consumption lower than the third power consumption mode, and the information storage device controls transition of the power consumption mode of the power management mechanism of the interface based on the current power consumption mode of the internal power management mechanism, wherein, when the power consumption mode of the internal power management mechanism is the third power consumption mode, the power consumption mode of the power management mechanism of the interface is made to shift from the first power consumption mode to the second power consumption mode after the lapse of a first time period from the termination of communication with the host computer; and when the power consumption mode of the internal power management mechanism is the fourth power consumption mode, the power consumption mode of the power management mechanism of the interface is made to shift from the first power consumption mode to the second power consumption mode after the lapse of a second time period shorter than the first time period from the termination of communication with the host computer.

7. A power consumption management method in an information recording/reproducing device having a host computer and an information storage device, wherein a power management mechanism of an interface connecting the host computer and the information storage device has a first power consumption mode and a second power consumption mode to keep power consumption lower than the first power consumption mode, an internal power management mechanism of the information storage device has a third power consumption mode and a fourth power consumption mode to keep power consumption lower than the third power consumption mode, the information storage device controls transition of the power consumption mode of the power management mechanism of the interface based on the current power consumption mode of the internal power management mechanism, the second power consumption mode has a first power saving mode and a second power saving mode to keep power consumption lower than the first power saving mode, and when the power consumption mode of the internal power management mechanism is the third power consumption mode, the power consumption mode of the power management mechanism of the interface is made to shift from the first power consumption mode to the first power saving mode after the lapse of a first time period from the termination of communication with the host computer, and when the power consumption mode of the internal power management mechanism is the fourth power consumption mode, the power consumption mode of the power management mechanism of the interface is made to shift from the first power consumption mode to the second power saving mode after the lapse of the first time period or a second time period shorter than the first time period from the termination of communication with the host computer.

* * * * *